United States Patent [19]

Matsuda et al.

[11] Patent Number: 5,424,584
[45] Date of Patent: Jun. 13, 1995

[54] CONTROL SYSTEM FOR A PLURALITY OF VEHICLE SAFETY DEVICES

[75] Inventors: Norio Matsuda; Masami Okano, both of Gumma, Japan

[73] Assignee: Airbag Systems Company Ltd., Tomioka, Japan

[21] Appl. No.: 28,228

[22] Filed: Mar. 9, 1993

[30] Foreign Application Priority Data

Mar. 19, 1992 [JP] Japan .................................. 4-093679

[51] Int. Cl.⁶ .............................................. B60R 21/32
[52] U.S. Cl. .................................. 307/10.1; 340/438; 280/735
[58] Field of Search ................ 307/10.1; 340/436, 438; 280/734, 735; 180/282

[56] References Cited

U.S. PATENT DOCUMENTS 5,155,376 10/1992 Okano .................................. 307/10.1
5,187,468 2/1993 Stonerook et al. .................. 340/438

FOREIGN PATENT DOCUMENTS 2-158445 6/1990 Japan .

Primary Examiner—Steven L. Stephan
Assistant Examiner—Aditya Krishnan
Attorney, Agent, or Firm—Fish & Richardson

[57] ABSTRACT

A control system for a plurality of vehicle safety devices has a feeder circuit and a check current supplying circuit. A plurality of actuating elements are arranged in the feeder circuit in parallel relation, and at the same time, they are arranged in the check current supplying circuit in serial relation. When a switching element is turned ON in accordance with a trigger signal coming from a collision judging circuit, an electric current flowing through the feeder circuit is caused to flow through the actuating elements in parallel. The check current flows to the actuating elements in series. The voltage generated between opposite ends of the serial circuit of the actuating elements in the check current supplying circuit is compared with a predetermined allowable range of voltage in a malfunction judging current, and when the voltage between the opposite ends is outside the predetermined allowable range of voltage, a malfunction detecting signal is outputted from the malfunction judging circuit.

12 Claims, 2 Drawing Sheets

CONTROL SYSTEM FOR A PLURALITY OF VEHICLE SAFETY DEVICES

BACKGROUND OF THE INVENTION

This invention relates to a system for controlling a plurality of vehicle safety devices, and particularly to an improvement of a circuit for checking the operability of actuating elements of the vehicle safety devices.

It is known that a driver's seat and an assistant driver's seat of an automobile vehicle are equipped respectively with air-bags (vehicle safety devices). U.S. Pat. No. 5,155,376 discloses a system for controlling the two air-bags as shown in FIG. 2. In a feeder circuit of this control system, two squibs (actuating elements) of the two air-bags are connected in parallel to a condenser (power source) having a large capacity. The two squibs are connected in series with two transistors (switching means), respectively. The control system further comprises a microcomputer. This microcomputer is operated to judge whether or not there is a vehicle collision in accordance with an acceleration signal coming from an acceleration sensor and output trigger signals respectively to the transistors when it judges that a vehicle collision has occurred. The transistors are turned ON in response to the trigger signals. As a result, electric current from the condenser is supplied to the squibs to ignite the squibs, thereby inflating the air-bags. The reason why the squibs are connected in parallel to each other is that by doing this, sufficient amounts of electric current are supplied respectively to the squibs upon the occurrence of a vehicle collision, so that the two air-bags can be assuredly inflated.

When one or both of the squibs are subjected to a malfunction (for example, short-circuited or accidentally opened), the air-bags become impossible to be inflated. Therefore, it is always necessary to monitor or check as to whether or not each squib is subjected to a malfunction. For this purpose, the control system disclosed in the above U.S. Patent Publication has a single electric current controlling circuit and two detection circuits. This electric current controlling circuit is operated to turn ON the two transistors to flow very weak check current in parallel to the two squibs, respectively. The detection circuits obtain a detection voltage in accordance with a voltage generated between opposite ends of the corresponding squibs, respectively. The microcomputer judges whether or not each detection voltage is within a predetermined allowable range of voltage, and outputs a malfunction detection signal to a display device when the judgement result is "NO".

The above control system requires a plurality of detection circuits corresponding to the number of the squibs, and therefore the cost is increased. In the microcomputer, since the malfunction diagnosis is carried out in accordance with the detection voltages from the squibs, the number of operation times is increased. Instead of the microcomputer, when discreet circuit such as, for example, a window comparator is to be used as malfunction diagnosing means, a plurality of window comparators are required and therefore the cost is increased. Furthermore, since the electric current control circuit is operated to turn ON the transistor to flow a check current to each squib in the state where there is no vehicle collision, there is a possibility that the air-bags are accidentally inflated due to malfunction of the electric current control circuit.

Japanese Laid-Open Patent Application No. 158445/90 discloses a system for controlling a single air-bag. In this control system, a very weak electric current is normally flowed in a feeder circuit, the voltage generated between opposite ends of a squib arranged in the feeder circuit is watched by a window comparator, and when this voltage is brought to be outside the allowable range, the window comparator actuates an alarm lamp.

SUMMARY OF THE INVENTION

It is an object of the present invention to provide a control system for a plurality of vehicle safety devices, which is capable of diagnosing a malfunction highly accurately with a simple construction.

According to the present invention, there is provided a control system for a plurality of vehicle safety devices, comprising:

(a) a feeder circuit having a power source, a plurality of actuating devices of the vehicle safety devices being arranged in parallel relation to each other in the feeder circuit and connected to the power source;

(b) a collision judging means for judging whether or not a vehicle collision has occurred so that a trigger signal is outputted therefrom when the collision judging means judges that a vehicle collision has occurred;

(c) switching means arranged in the feeder circuit, the switching means being turned ON responsive to the trigger signal to supply electric current from the power source to the actuating elements, thereby actuating the vehicle safety devices;

(d) a check current supplying circuit for supplying check current to the actuating elements, the actuating elements being arranged in serial relation to each other in the check current supplying circuit, thereby forming a serial circuit; and (e) a malfunction judging means for comparing a voltage generated between opposite ends of the serial circuit formed by the actuating elements in the check current supplying circuit with a predetermined allowable range of voltage so that a malfunction detection signal is outputted from the malfunction judging means when the voltage generated between the opposite ends is outside the predetermined allowable range of voltage.

DETAILED DESCRIPTION OF THE EMBODIMENTS

One embodiment of the present invention will be described hereinafter with reference to FIG. 1.

Figure 1:
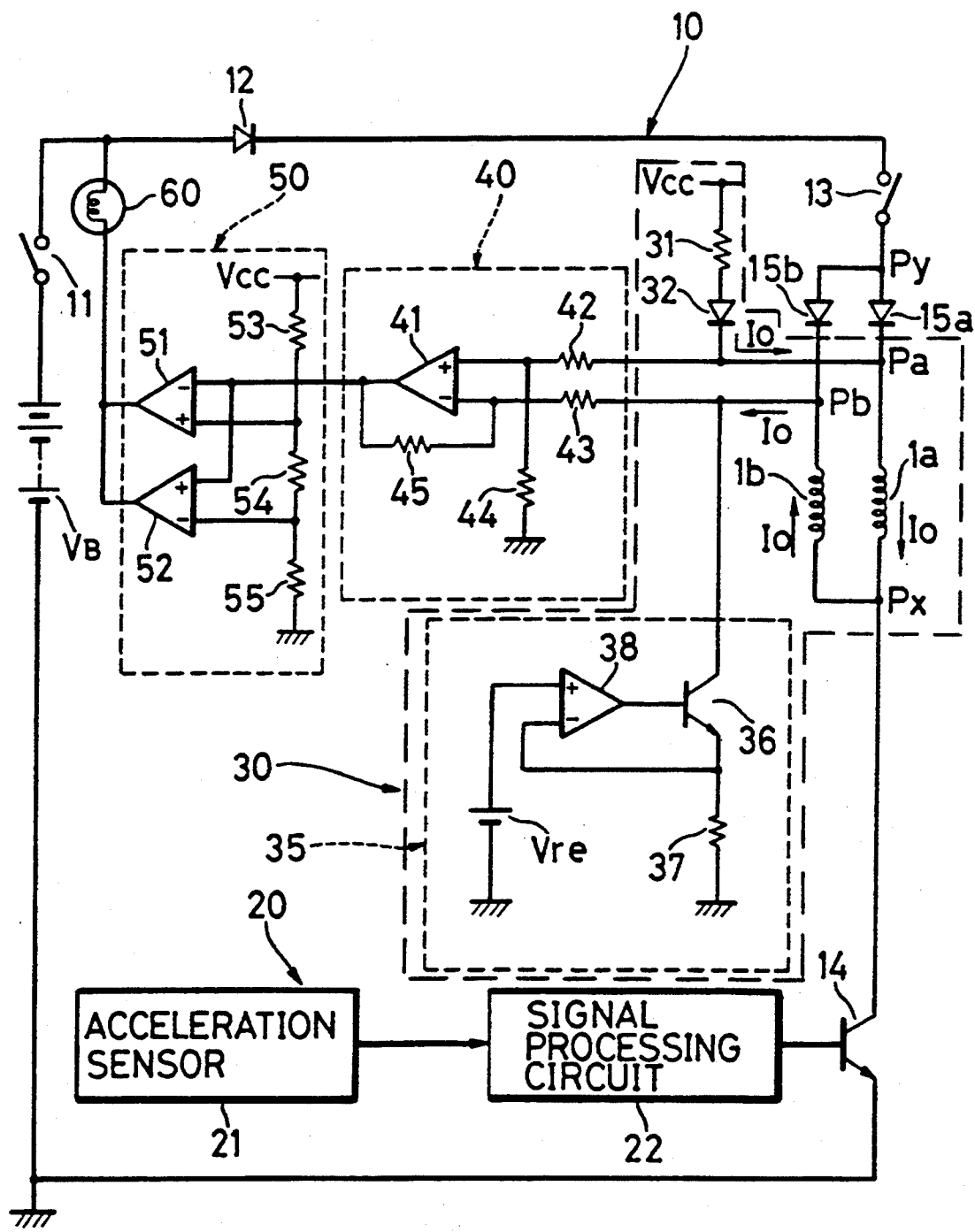
FIG. 1 is a circuit diagram showing a control system for a plurality of vehicle safety devices according to one embodiment of the present invention.

A control system of FIG. 1 is operated control two air-bags (vehicle safety devices) mounted one at a driver's seat and the other at an assistant driver's seat. The two air-bags include squibs 1a and 1b (actuating elements), respectively. The control system has a feeder circuit 10 connected to a battery $V_B$ (power source). The feeder circuit 10 comprises an ignition switch 11, a diode 12, a safing switch 13, and a transistor 14 (switching means), all of which are arranged in series in this order from a positive pole of the battery $V_B$ toward the ground. The safing switch 13 is turned ON at the occurrence of a vehicle collision by means of a mechanical construction thereof.

In the feeder circuit 10, the squibs 1a and 1b are arranged in parallel relation to each other between the safing switch 13 and the transistor 14. One end of the squib 1a is connected at a connecting point Px to one end of the other squib 1b, while the other end of the former is connected at a connecting point Py to the other end of the latter. The connecting point Px is connected to the ground through the transistor 14, and the other connecting point Py is connected to the positive pole of the battery $V_B$ through the safing switch 13, the diode 12 and the ignition switch 11. A diode 15a is connected in series to the squib 1a between the other end of the squib 1a and the connecting point Py. A diode 15b is connected in series to the squib 1b between the other end of the squib 1b and the connecting point Py. Anodes of the diodes 15a and 15b are faced with the connecting point Py (i.e., battery $V_B$), while cathodes of the diodes 15a and 15b are faced with the squibs 1a and 1b (i.e., the ground), respectively. The diode 15a is served as a check current preventing means as later described.

The control system further comprises a collision judging means 20. This collision judging means 20 includes an acceleration sensor 21, and a signal processing circuit 22 for processing an acceleration signal coming from the acceleration sensor 21. The signal processing circuit 22 includes an integration circuit for integrating the acceleration signal, and a comparison circuit for comparing an integral value outputted from this integration circuit with a threshold level. When the integral value is increased in a decelerating direction and exceeds the threshold level upon a vehicle collision, a high level trigger signal is outputted to a base of the transistor 14 from the signal processing circuit 22 to turn ON the transistor 14. When this transistor is turned ON and the safing switch 13 is also turned ON, electric current is supplied respectively to the squibs 1a and 1b from the battery $V_b$. As a result, the squibs 1a and 1b are ignited to inflate the air-bags. At that time, since the electric current is supplied in parallel to the squibs 1a and 1b from the battery $V_B$, sufficient amounts of electric current are supplied respectively to the squibs 1a and 1b, thereby assuredly inflating the two air-bags.

Next, there will be described in detail the function for judging whether or not there is a malfunction in the squibs 1a and 1b such as short-circuited or accidentally opened. The control system comprises a check current supplying circuit 30. This check current supplying circuit 30 includes a constant voltage source Vcc (auxiliary power source). This constant voltage source Vcc is connected to the connecting point Pa between the squib 1a and the diode 15a. A current limiting resistor 31 and a diode 32 are connected in series between the constant voltage source Vcc and the connecting point Pa. The check current supplying circuit 30 further includes a constant current circuit 35. This constant current circuit 35 includes a transistor 36, a detection resistor 37, an operational amplifier 38, and a reference voltage source Vre. A collector of the transistor 36 is connected to a connecting point Pb between the other squib 1b and the diode 15b, and an emitter is connected to the ground through the detection resistor 37.

Here, an important thing is that the squibs 1a and 1b are arranged in the check current supplying circuit 30 in serial relation. Owing to this arrangement, the check current $I_o$ from the constant voltage source Vcc flows through the squibs 1a and 1b in series. More specifically, a check current $I_o$ from the constant voltage source Vcc flows through the current limiting resistor 31, the diode 32, the squibs 1a and 1b, the transistor 36, and the detection resistor 37 in order. The check current $I_o$ is prevented from flowing in a direction opposite to the squib 1a from the connecting point Pa by the diode 15a.

In the constant current circuit 35, an output terminal of the operational amplifier 38 is connected to a base of the transistor 36, an inverting input terminal is connected between the emitter of the transistor 36 and the detection resistor 37, and a non-inverting input terminal is connected to the reference voltage source Vre. In the operational amplifier 38, a base current to the transistor 36 is controlled such that a terminal voltage of the detection resistor 37 is equal to the reference voltage Vre. As a result, a constant check current $I_o$ is supplied to the squibs 1a and 1b.

The voltage between opposite ends of the serial circuit of the squibs 1a and 1b, in other words, the voltage between the connecting points Pa and Pb, is amplified by a differential amplification circuit 40 (detection circuit) and served as a detection voltage. Since the differential amplification circuit 40 is known per se, detail description thereof is omitted. The differential amplification circuit 40 includes an operational amplifier 41 and four resistors 42, 43, 44, and 45.

The detection voltage amplified in the differential amplification circuit 40 is inputted into a window comparator 50 (malfunction judging means). This window comparator 50 includes two comparators 51 and 52, and three resistors 53, 54 and 55 connected in series from the constant voltage source Vcc toward the ground. The voltage appearing at the connecting point of the resistors 53 and 54 is inputted into a non-inverting input terminal of the comparator 51 as an upper limit reference voltage, while the voltage appearing at a connecting point of the resistors 54 and 55 is inputted into an inverting input terminal of the other comparator 52 as a lower limit reference voltage. The detection voltage from the differential amplification circuit 40 is inputted into an inverting input terminal of the comparator 51 and non-inverting input terminal of the other comparator 52. An alarm lamp 60 is connected between output terminals of the comparators 51 and 52, and the battery $V_B$.

With the above construction, in the case where both the squibs 1a and 1b are normal, the detection voltage is lower than the upper limit reference voltage of the window comparator 50 but higher than the lower limit reference voltage thereof. Therefore, the outputs of the comparators 51 and 52 are in high levels, and the alarm lamp 60 is kept OFF.

When one of the squibs 1a and 1b is short-circuited, a combined resistance of the squibs 1a and 1b connected in series in the check current supplying circuit 30 is reduced in half compared with that when both the squibs 1a and 1b are normal. When both the squibs 1a and 1b are short-circuited, this combined resistance becomes zero. Therefore, when at least one of the squibs 1a and 1b is short-circuited (short malfunction), the detection voltage becomes lower than the lower limit reference voltage of the window comparator 50, and the output of the comparator 52 is brought to a low level (malfunction detection signal). As a result, the alarm lamp 60 is turned ON.

When at least one of the squibs 1a and 1b is accidentally opened (open malfunction), the combined resistance of the squibs 1a and 1b becomes infinite. Therefore, the detection voltage becomes higher than the upper limit reference voltage of the window comparator 50 and the output of the comparator 51 is brought to be a low level (malfunction detection signal). As a result, the alarm lamp 60 is turned ON.

As described above, since check current is supplied to the squibs 1a and 1b so as to bring the voltage between opposite ends of the serial circuit thereof into the detection voltage, there can be obtained a highly accurate malfunction diagnosis. The reason will be described hereinafter in detail comparing with a comparison example not shown. In the comparison example, the check current is supplied to the squibs 1a and 1b which are connected in parallel relation to each other in the check current supplying circuit, and the voltage generated between the opposite ends of the parallel circuit is amplified to obtain the detection voltage. For the purpose of easy explanation, the values of resistance of the squibs 1a and 1b are represented by 2Ω, respectively. When both the squibs 1a and 1b are short-circuited, the combined resistance of the squibs 1a and 1b is 0Ω in this embodiment as well as in the comparison example. When both the squibs 1a and 1b are accidentally opened, the combined resistance is infinite both in this embodiment and in the comparison example. A difference between this embodiment and the comparison example appears at the time when both the squibs 1a and 1b are normal and when only one of them is subjected to a malfunction. That is, when both the squibs 1a and 1b are normal, the combined resistance is 4Ω in this embodiment but 1Ω in the comparison example. When only one of the squibs 1a and 1b is short-circuited, the combined resistance is 2Ω in this embodiment but 0Ω in the comparison example. When only one of the squibs 1a and 1b is accidentally opened (open malfunction), the combined resistance is infinite in this embodiment but 2Ω in the comparison example.

As apparent from the foregoing description, in the comparison example, the range where the combined resistance of the squibs 1a and 1b can be regarded as normal is so small as more than 0Ω but less than 2Ω (for example 0.5 to 1.5Ω), and therefore the allowable range of voltage set by the window comparator is required to be so small as to correspond to that.

In contrast, in this embodiment, the range where the combined resistance of the squibs 1a and 1b can be regarded as normal is such a large value as more than 2Ω but less than infinite (for example, 3Ω to 10Ω), and therefore the allowable range of voltage set by the window comparator 50 can be made so large as to correspond to that. Furthermore, a difference between the lower limit of the allowable range of voltage and the detection voltage at the time when one of the squibs 1a and 1b is short-circuited can be made large, and a difference between the upper limit of the allowable range of voltage and the detection voltage at the time when one of the squibs 1a and 1b is accidentally cut or opened can be made large. As a result, the accuracy of the malfunction diagnosis can be increased. Moreover, the check current for obtaining a satisfactory accuracy of the malfunction diagnosis can be reduced.

In the above embodiment, it is not necessary to turn ON the transistor 14 when the check current is to be applied, and the transistor 14 is turned ON only in response to the trigger signal at the occurrence of a vehicle collision. Therefore, the possibility for erroneously operating the transistor 14 to inflate the air-bags accidentally can be minimized.

In the above embodiment, the diode 15a is used for preventing the check current $I_o$ from flowing to the connecting point Pb from the connecting point Pa via the connecting point Py, while the other diode 15b is used to flow a large electric current equally to the squibs 1a and 1b at the occurrence of a vehicle collision.

Other embodiments of the present invention will be described next. In these embodiments to be described, only portions different from those of the preceding embodiment are illustrated, and those members corresponding to those of the preceding embodiment are designated by identical numerals and description thereof is omitted.

Figure 2:
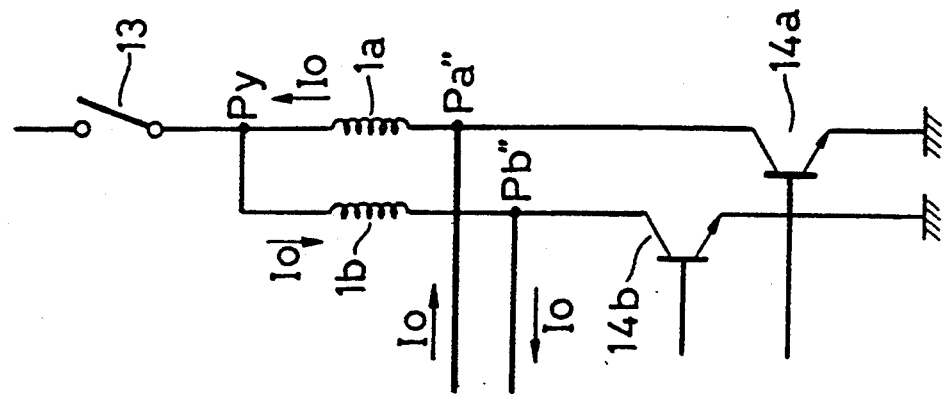
FIG. 2 is likewise a circuit diagram showing an important portion of a control system for a plurality of vehicle safety devices according to a modified embodiment of the present invention.

In the embodiment of FIG. 2, a diode 15a is connected between a squib 1a and a connecting point Px on the ground side, while another diode 15b is connected between the other squib 1b and the connecting point Px. Anodes of the diodes 15a and 15b are faced with a battery $V_B$, while cathodes thereof are faced with the ground. In this embodiment, a check current $I_o$ enters into a connecting point Pa' between the squib 1a and the diode 15a, then passes through the squibs 1a and 1b in order, and then flows toward a constant current circuit via a connecting point Pb' between the squib 1b and the diode 15b. The voltage between the connecting points Pa' and Pb' is supplied to a window comparator via a differential circuit. In this embodiment, the diode 15b is used for preventing the check current $I_o$ from flowing toward the connecting point Pb' via the connecting point Px from the connecting point Pa'.

Figure 3:
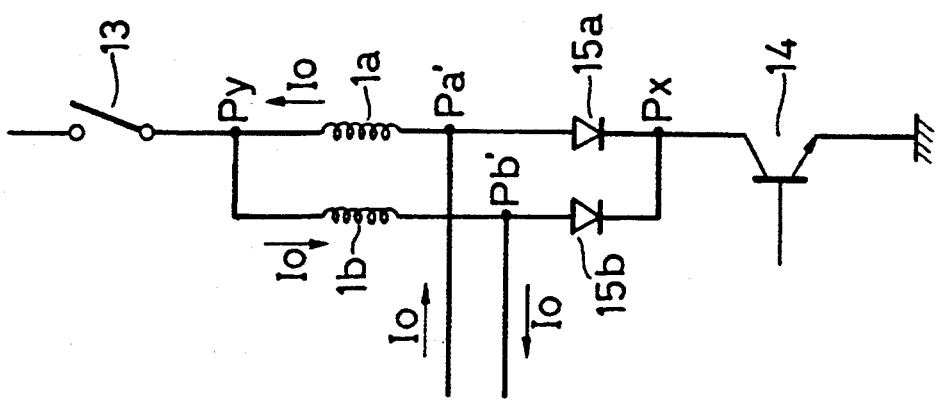
FIG. 3 is likewise a circuit diagram showing an important portion of a control system for a plurality of vehicle safety devices according to another modified embodiment of the present invention.

In the embodiment of FIG. 3, a transistor 14a is connected between a squib 1a and the ground. Similarly, a transistor 14b is connected between a squib 1b and the ground. These transistors 14a and 14b are turned ON in response to trigger signals received by their bases upon the occurrence of a vehicle collision. The check current $I_o$ enters into a connecting point Pa" between the squib 1a and the transistor 14a. This check current $I_o$ passes through the squibs 1a and 1b, and then flows toward the constant current circuit via a connecting point Pb" between the squib 1b and the transistor 14b. Voltage between the connecting points Pa" and Pb" is amplified in the differential amplification circuit so as to be supplied to the window comparator. In this embodiment, the check current $I_o$ is prevented from flowing toward the ground from the connecting point Pa" by the transistor 14a.

In FIG. 3, a transistor may be disposed between a connecting point Py and the squib 1a, and another transistor may be disposed between the connecting point Py and the squib 1b.

The present invention is not limited to the above embodiments, and many other modifications are available. For example, the window comparator 50 as the malfunction judging means and the signal processing circuit 22 may be replaced by a single microcomputer. In that case, the malfunction diagnosis is not carried out for each squib 1a (or 1b). Instead, since the malfunction diagnosis is effected in accordance with a detection voltage corresponding to a combined resistance of the squibs 1a and 1b, the number of diagnosis can be reduced. The battery $V_B$ may be used directly as an auxiliary power source of the check current supplying circuit.

The control system of the present invention may be applied to a pretensioner of a seat belt in addition to the air-bag.

What is claimed is:

1. A control system for first and second vehicle safety devices, comprising:
   (a) a feeder circuit having a power source, first and second actuating elements of said vehicle safety devices being arranged in parallel relation to each other in said feeder circuit, input ends of said first and second actuating elements being connected to said power source, and output ends of said first and second actuating elements being connected to each other to form a connecting point;
   (b) a collision judging means for judging whether or not a vehicle collision has occurred so that a trigger signal is outputted therefrom when said collision judging means judges that a vehicle collision has occurred;
   (c) switching means arranged in said feeder circuit, said switching means being turned ON responsive to said trigger signal to supply electric current from said power source to said actuating elements, thereby actuating said vehicle safety devices;
   (d) a check current supplying circuit for supplying check current from said input end of said first actuating element to said input end of said second actuating element via said connecting point, said check current serially flowing through said first and second actuating elements; and
   (e) a malfunction judging means for comparing a voltage generated between said input ends of said first and second actuating elements with a predetermined allowable range of voltage so that a malfunction detection signal is outputted from the malfunction judging means when said voltage generated between said input ends is outside said predetermined allowable range of voltage.

2. A control system according to claim 1, in which said input ends of said first and second actuating elements are connected to each other to form a second connecting point, and said control system further comprises a check current preventing means for preventing the check current from flowing from said input end of said first actuating element to said input end of said second actuating element via said second connecting point.

3. A control system according to claim 2, in which said check current preventing means includes a diode, said diode being disposed between said second connecting point and said input end of said first actuating element, an anode of said diode being connected to said power source and a cathode of said diode being connected to said first actuating element.

4. A control system according to claim 2, in which said malfunction judging means includes a window comparator.

5. A control system according to claim 3, in which another diode is disposed between said second connecting point and said input end of said second actuating element, an anode of said another diode being connected to said power source, and a cathode of said another diode being connected to said second actuating element.

6. A control system according to claim 2, in which said check current supplying circuit includes an auxiliary power source connected to said input end of said first actuating element, and a constant current circuit connected to said input end of said second actuating element.

7. A control system for first and second vehicle safety devices, comprising:
   (a) a feeder circuit having a power source, first and second actuating elements of said vehicle safety devices being arranged in parallel relation to each other in said feeder circuit, input ends of said first and second actuating elements being connected to each other to form a connecting point, said connecting point being connected to said power source;
   (b) a collision judging means for judging whether or not a vehicle collision has occurred so that a trigger signal is outputted therefrom when said collision judging means judges that a vehicle collision has occurred;
   (c) switching means arranged in said feeder circuit, said switching means being turned ON responsive to said trigger signal to supply electric current from said power source to said actuating elements, thereby actuating said vehicle safety devices;
   (d) a check current supplying circuit for supplying check current from an output end of said first actuating element to an output end of said second actuating element via said connecting point, said check current serially flowing through said first and second actuating elements; and
   (e) a malfunction judging means for comparing a voltage generated between said output ends of said first and second actuating elements with a predetermined allowable range of voltage so that a malfunction detection signal is outputted from the malfunction judging means when said voltage generated between said output ends is outside said predetermined allowable range of voltage.

8. A control system according to claim 7, in which said switching means includes first and second transistors which are connected in series respectively to said first and second actuating elements, said first transistor being disposed between said first actuating element and the ground, and said second transistor being disposed between said second actuating element and the ground.

9. A control system according to claim 7, in which said output ends of said first and second actuating elements are connected to each other to form a second connecting point, and said control system further comprises a check current preventing means for preventing the check current from flowing from said output end of said first actuating element to said output end of said second actuating element via said second connecting point.

10. A control system according to claim 9, in which said check current preventing means includes a diode, said diode being disposed between said second connecting point and said output end of said second actuating element, an anode of said diode being connected to said second actuating element and a cathode of said diode being connected to the ground.

11. A control system according to claim 10, in which another diode is disposed between said second connecting point and said output end of said first actuating element, an anode of said another diode being connected to said first actuating element and a cathode of said another diode being connected to the ground.

12. A control system according to claim 7, in which said check current supplying circuit includes an auxiliary power source connected to said output end of said first actuating element, and a constant current circuit connected to said output end of said second actuating element.

* * * * *